US011556269B2

(12) United States Patent
Ihara et al.

(10) Patent No.: US 11,556,269 B2
(45) Date of Patent: Jan. 17, 2023

(54) INFORMATION PROCESSING SYSTEM, DATA TRANSFER METHOD AND DATA TRANSFER PROGRAM

(71) Applicant: Hitachi, Ltd., Tokyo (JP)

(72) Inventors: Hiroka Ihara, Tokyo (JP); Nobuhiro Yokoi, Tokyo (JP); Akira Deguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/470,094

(22) Filed: Sep. 9, 2021

(65) Prior Publication Data

US 2022/0179559 A1    Jun. 9, 2022

(30) Foreign Application Priority Data

Dec. 4, 2020 (JP) .............................. JP2020-202194

(51) Int. Cl.
*G06F 3/06* (2006.01)

(52) U.S. Cl.
CPC .............. *G06F 3/065* (2013.01); *G06F 3/061* (2013.01); *G06F 3/067* (2013.01)

(58) Field of Classification Search
None
See application file for complete search history.

(56) References Cited

U.S. PATENT DOCUMENTS

| 7,318,134 B1* | 1/2008 | Oliveira .............. G06F 11/1471 711/161 |
| 10,467,102 B1 | 11/2019 | Baruch |
| 2008/0281879 A1* | 11/2008 | Kawamura ......... G06F 11/1471 |

* cited by examiner

*Primary Examiner* — Brian R Peugh
(74) *Attorney, Agent, or Firm* — Mattingly & Malur, PC

(57) ABSTRACT

An information processing system includes a first storage system for supplying a primary site, and a second storage system for supplying a secondary site. The first storage system is allowed to execute replication by transferring a processing history of a data volume of the first storage system to the second storage system, and to transfer multiple processing histories collectively. The first storage system integrates histories of multiple write accesses included in the multiple processing histories to be collectively transferred, which are duplicatedly addressed on the volume for transfer.

8 Claims, 19 Drawing Sheets

FIG.3

| ORIGINAL SEQUENCE NO. ~9 | SEQUENCE NO. ~12 | TIMESTAMP ~15 | WRITE ADDRESS ~18 | JNL DATA ADDRESS ~21 | OTHER METADATA ~24 |
|---|---|---|---|---|---|
| 1563 | 1563 | 09:17:58 | 13-23 | 0 | ... |
| 1564 | 1564 | 09:18:20 | 46-97 | 10 | ... |
| 1565 | 1564 | 09:18:41 | 109-154 | 61 | ... |
| 1566 | 1564 | 09:18:53 | 85-114 | 106 | ... |
| 1567 | 1567 | 09:19:26 | 258-297 | 135 | ... |
| 1568 | 1567 | 09:19:33 | 265-271 | 174 | ... |
| 1569 | 1569 | 09:20:08 | 302-315 | 180 | ... |

27

JNCB[S1]

JNCB[S2]

JNCB[S1]

JNCB[S2]

INFORMATION PROCESSING SYSTEM, DATA TRANSFER METHOD AND DATA TRANSFER PROGRAM

CROSS-REFERENCE TO RELATED APPLICATION

The present application claims priority from Japanese application JP 2020-202194, filed on Dec. 4, 2020, the contents of which is hereby incorporated by reference into this application.

BACKGROUND

The present invention relates to an information processing system which executes replication, a data transfer method, and a data transfer program.

The information processing system for handling important data is configured to form a storage including a pair of primary storage system and secondary storage system, and store the same data in both the primary storage and the secondary storage, which are synchronized so that data loss owing to failure is prevented.

Every time when data are updated in response to the host I/O in the primary storage, such updating is reflected on the secondary storage (replication) so that data synchronization between the primary storage and the secondary storage is maintained. The replication method includes synchronous replication and asynchronous replication, both of which are known.

The synchronous replication serves to reflect the updated content on the secondary storage every occurrence of the host I/O, and to keep the host un-notified of completion of the I/O until reflection is completed. The asynchronous replication serves to reflect the updating on the secondary storage at the timing independent from the host I/O.

As for the asynchronous replication, the continuous replication and the snapshot replication have been widely known. In the splitter type continuous replication, the host I/O is processed by the primary storage, and simultaneously, transferred from the primary storage to the secondary storage via the I/O splitter. In the journal type continuous replication, the host I/O log received by the primary storage is recorded as the journal, which is transferred to the secondary storage at the specific timing. In the snapshot replication, the snapshot of the primary storage is generated at the specific timing, which is then transferred to the secondary storage.

The continuous replication is characterized by the short RPO (Recovery Point Objective) as a result of transferring the updating of the primary storage to the secondary storage by a unit of I/O. Meanwhile, the snapshot replication is characterized by the suppressed traffic as a result of transferring updated contents collected in a certain period to the secondary storage.

In the case of connection between the primary storage and the secondary storage via the dedicated line, the transfer amount is not strictly restricted. Accordingly, it is preferable to execute the continuous replication so that the RPO is kept short. Meanwhile, in the case of connection between the primary storage and the secondary storage via the shared line such as WAN (Wide Area Network), the available band varies in accordance with the communication status of the third party. Execution of the continuous replication may make the transfer amount excessive. In the configuration as described above, it is preferable to execute the snapshot replication which allows suppression of the transfer amount.

Execution of the replication via the shared line causes constant change in the line environment or the transfer amount. Therefore, it is preferable to select the replication type whichever is suitable for the circumstance without considering the absolute superiority-inferiority relation between the replication types. In the invention as disclosed in U.S. Ser. No. 10/467,102, the replication type is selected between the continuous replication and the snapshot replication in accordance with the storage usage status and the line environment so that both the RPO and the transfer amount can be optimized.

SUMMARY

The technique as disclosed in U.S. Ser. No. 10/467,102 requires implementation of replications of both types in the storage system. Furthermore, the user is required to carry out operation settings for the replications of both continuous type and snapshot type, resulting in a large burden on human resources.

The present invention herein proposes the method for dynamically making the RPO and the transfer amount variable on the basis of the journal type continuous replication in the scope covering from the normal continuous replication to the one at the level equivalent to the snapshot replication while minimizing change in the implementation and the configuration maintenance as the burden on the user.

In a representative case relating to the information processing system, the data transfer method, and the data transfer program, the information processing system includes a first storage system for supplying a primary site, and a second storage system for supplying a secondary site. The first storage system is allowed to execute replication by transferring a processing history of a data volume of the first storage system to the second storage system, and to transfer multiple processing histories collectively. The first storage system integrates histories of multiple write accesses included in the multiple processing histories to be collectively transferred, which are duplicatedly addressed on the data volume for transfer.

Application of the present invention to the replication ensures to satisfy requirements of the RPO and the transfer amount each at the level equivalent to that of the snapshot replication while minimizing the change in implementation and the configuration maintenance as the burden on the user.

The problems, configurations, and effects except those described above are clarified by explanations of the following examples.

BRIEF DESCRIPTION OF THE DRAWINGS

FIG. 3 illustrates an exemplified JNCB management table implementation according to the present invention;

DETAILED DESCRIPTION

Figure 1:
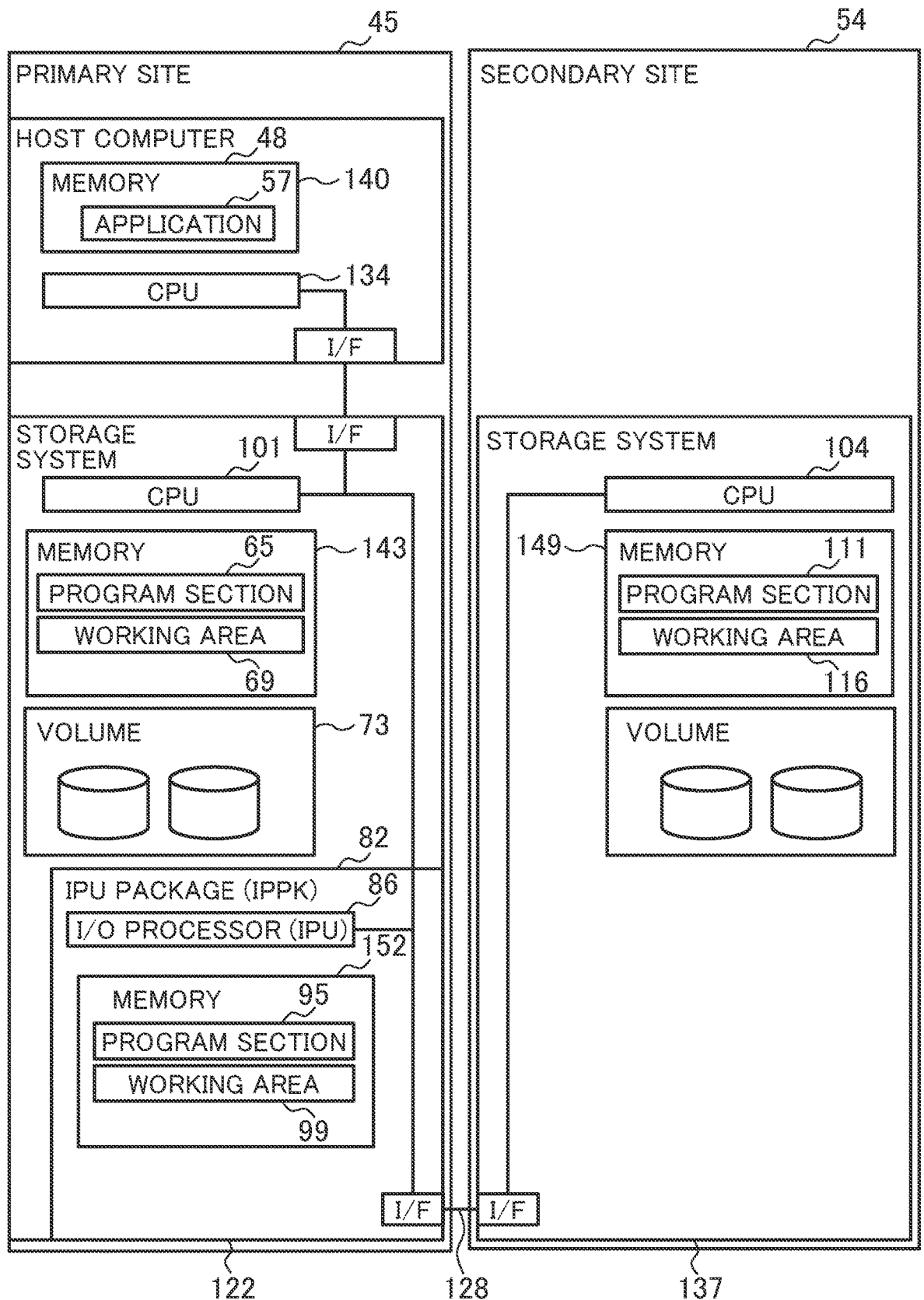
FIG. 1 is a block diagram illustrating an exemplified configuration of an information system according to the first and the second embodiments of the present invention.

Embodiments of the present invention will be described referring to the drawings.

It is understood that the following descriptions and drawings are by way of examples only, which are omitted and simplified as needed. The present invention can be applied in various forms, and allows the use of either single component or multiple components unless otherwise specifically limited.

The following examples are not intended to limit the scope of the invention, and all combinations of the elements to be described in the examples are not necessarily essential for solutions provided by the present invention.

Terms of the following explanations will be described hereinafter.

Firstly, among logical volumes secured in the storage system of the primary site or the secondary site, the one reserved for journal storage will be collectively referred to as "JVOL". Among the logical volumes secured in the storage system of the primary site, the one reserved for data storage will be referred to as "PVOL". Among the logical volumes secured in the storage system of the secondary site, the one reserved for data storage will be referred to as "SVOL". Each of the "JVOL", "PVOL", "SVOL" does not necessarily indicate the single logical volume. The process may be executed across a plurality of logical volumes.

Secondly, such components as the CPU (Central Processing Unit), the memory, and the JVOL in the primary site and the secondary site may be described without making distinction between those of the primary site and the secondary site. In this case, the component whether it is installed in the primary site or the secondary site will be determined appropriately according to a context.

Thirdly, a description may be made with respect to the I/O that involves the peripheral device including the cache mechanism, which is directly required by the device. In this case, it is assumed that the cache mechanism is appropriately operated so that the I/O from the cache is executed.

Fourthly, a description may be made with respect to the process for releasing the area on the memory or the storage device. Depending on the case where the device structure or implementation of control software in the device, for example, the storage device composed of SSD (Solid State Drive), there may be the case that the actual release processing is suspended, and only logically recorded that the area has been released.

Fifthly, it may be specified that the memory area used for processing is terminated without releasing. It is assumed that such mechanism as GC (Garbage Collection) is operated to appropriately release the used memory area.

Sixthly, the term "program" may be explained as the subject for executing the processing. This indicates that the processor for executing the program issues the I/O to the peripheral device such as the storage appropriately in accordance with the processing defined in the program. If the processor for executing the program is not specified, the appropriate processor is expected to execute the program in accordance with the environment for executing the program.

Seventhly, the description that the data and commands are "transferred" or "issued" between the components indicates the communication operation as a whole from selection of the communication path suitable for the condition by the processor or the like as the subject for "transferring" or "issuing" such data or commands to execute the "transferring" or "issuing" on the path until acknowledgement of completion of reception by the component for receiving the data and commands.

First Example

An overview of the present invention will be described.

The replication according to the present invention is executed as below. The journal volume is provided in the storage of the primary site. The I/O issued from the primary site host to the storage is reflected on the data volume, and simultaneously, the journal of the I/O is stored in the journal volume. The journal stored in the journal volume is transferred to the storage of the secondary site so that the content of the journal is reflected on data volume of the secondary site.

The present invention proposes the method of reducing transfer amount by executing compaction to the journal stored in the journal volume of the primary site. Specifically, multiple write accesses to the same address are regarded as being generated at the same time. The compaction is executed by holding newly written data only while deleting old data from the journal so as not to be transferred to the secondary site. This method is expected to reduce the transfer amount of data by deleting a part of the written data from the journal.

In the method, the written content deleted from the journal cannot be restored in the secondary site. If the compaction is executed to the journal limitlessly, the transfer amount may be largely reduced. On the contrary, the resultant RPO is deteriorated.

According to the present invention, the journal transfer is expected to be carried out through the issue of the read command of the journal from the storage of the secondary site to the storage of the primary site, and corresponding transfer of the journal by the storage of the primary site. In this method, the storage of the secondary site monitors the network environment and the storage usage status to adjust the read command issue interval. It is therefore possible to change the amount of journal to be collectively transferred.

According to the present invention, it is assumed that the storage of the secondary site has the above-described mechanism for adjustment in the compaction range. In other words, when the storage of the primary site receives the read command, the compaction is executed in the range of the journal accumulated in the storage of the primary site from the time point of the previous read command. The storage of the secondary site broadens the read command interval to indirectly request the storage of the primary site to execute the stronger compaction. Meanwhile, the storage of the secondary site issues the read command at the shorter interval to substantially invalidate the effect of the compaction.

If the amount of journal subjected to compaction is sufficiently large, in principle, the effect of the compaction is expected to be brought into the level substantially equivalent to that of the snapshot replication.

If compaction is executed between the journal A recorded at a certain time and the journal B recorded at the same address after an elapse of 5 minutes, the content of the journal A is lost. Accordingly, it is impossible for the secondary site to restore the I/O content of the journal A independently. Upon restoration of the journal recorded at certain timing in the period from the time just after recording the journal A to the time just before recording the journal B in the secondary site, the order of I/O is reversed as the content of the journal A has been lost. In order to integrate the journals A and B, each of journals generated at every time point between them has to be subjected to compaction on the assumption that they have been generated simultaneously. Functionally, this applies to generation of the snapshot in the storage of the primary site at the time when the journal B is generated from the starting time when the journal A has occurred.

In principle, execution of compaction to the journal appropriately in accordance with the line state and the usage status of storage attains the transfer amount at the level equivalent to that of the snapshot replication while allowing execution of journal type continuous replication.

FIG. 1 is a block diagram illustrating an exemplified configuration of the information system according to an example.

The information processing system of the first embodiment includes a storage system 122 provided in a primary site 45, a storage system 137 provided in a secondary site 54, and a host computer 48. The storage system 122 of the primary site 45 is connected to the host computer 48. The storage systems of the primary site and the secondary site are interconnected via a network 128.

Normally, it is assumed that WAN (Wide Area Network) is used as the network 128. However, LAN (Local Area Network) may be used.

The host computer 48 is a computer device including peripheral devices necessary for execution of application 57 in addition to a CPU (Central Processing Unit) 134 and a memory 140, and issues an I/O command to the connected storage system 122 in response to the request of the application 57.

The storage system 122 of the primary site includes a processor 101 and a main memory 143 for operating storage control software 102. The storage control software 102 reads and writes data of a volume 73 for supply of a storage function to the host computer 48, and overall control of the storage system 122.

An accelerator for data compression/expansion may be installed in the storage system 122 of the primary site. The accelerator is configured to receive data from the CPU 101 via the bus such as PCI Express, and execute compression/expansion of the data. The resultant data are returned to the CPU 101.

Similar to the case of the primary site 45, the storage system 137 of the secondary site 54 is controlled by a processor 104 and storage control software 102 running on a main memory 149. It is possible to connect the host computer to the storage system 137 of the secondary site 54, and supply the storage function to the host computer. The storage function to the host computer of the secondary site 54 is required not to influence the content of the example. Accordingly, an explanation of the host computer of the secondary site 54 will be omitted.

The storage system 122 of the primary site 45 includes an IPU package 82 in which an IPU (I/O Processing Unit) 86 and an IPU memory 152 are installed. The IPU package 82 is connected to the CPU 101 of the storage system 122 via the bus such as PCI Express, for example, for intercommunication between the IPU package 82 and the CPU 101. IPU control software 108 runs on the memory 152 in the IPU package 82 for controlling communication between the storage systems 122 and 137.

Figure 2:
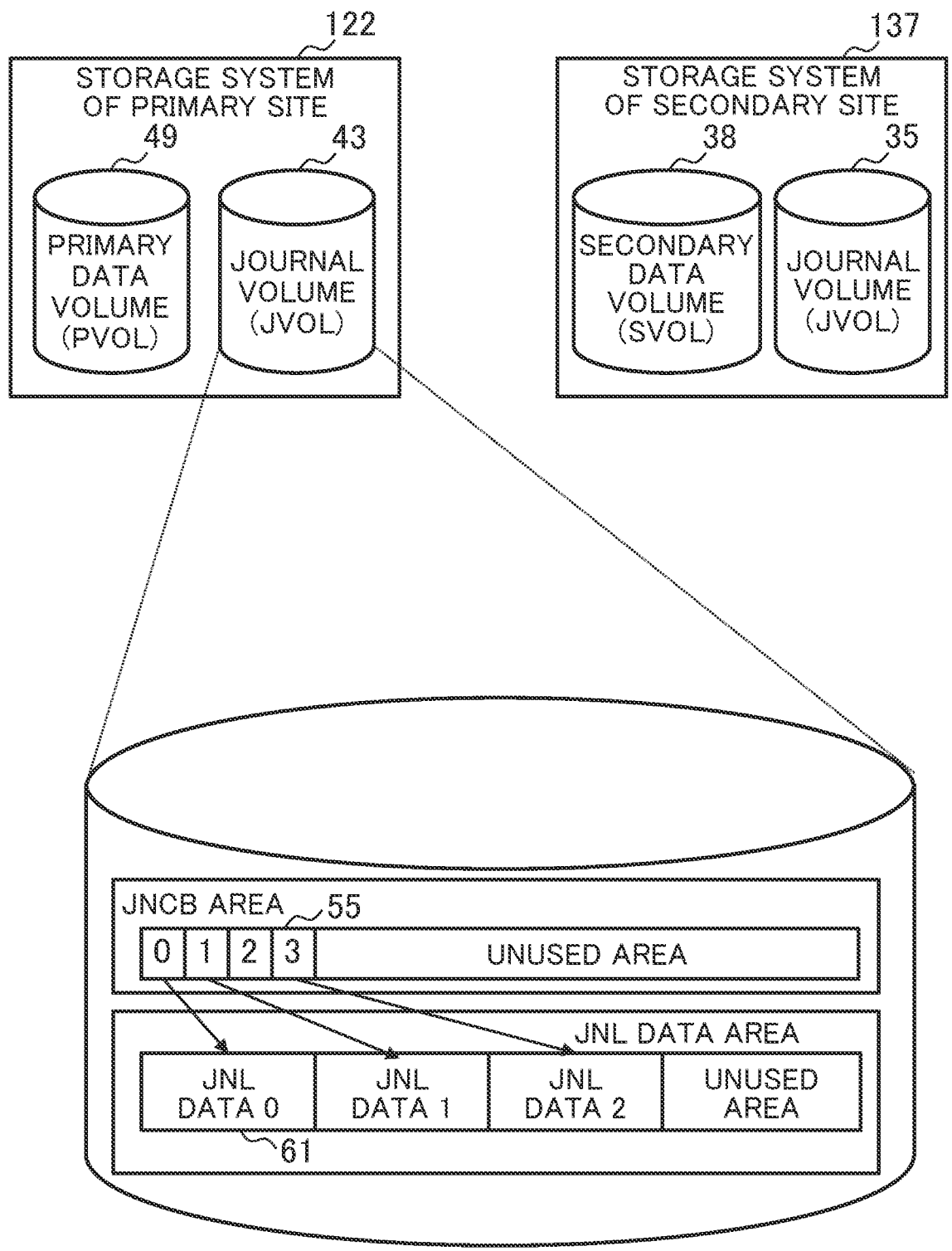
FIG. 2 illustrates an example of a journal storage volume configuration according to the present invention.

FIG. 2 illustrates an example of a journal storage volume configuration according to the example.

When the storage system 122 of the primary site 45 receives the write access from the host computer 48, an access log as the journal is written to a JVOL 43. The journal refers to the data configuration in which a data operation procedure on the volume 73 through the write access is recorded. The I/O can be reproduced even by the third party except the storage system 122 that has received the write access by referring to the journal.

The journal as described in the present invention includes a JNCB 55 and JNL data 61. Hereinafter, the journal may be referred to as JNL.

The JNCB 55 denotes a data block which records metadata including such information as address and order of the write access. The JNCB 55 includes integer values each called a sequence number that has to be a monotonous nondecreasing value which can uniquely specify the occurrence order of the write access.

The JNCB 55 can be managed by an arbitrary data configuration so long as data can be stored, read, and deleted. In the example, the JNCB 55 is configured to sufficiently implement high-speed look-up function from the sequence number. For example, the JNCB 55 can be managed using the table of FIG. 3.

The data actually written through the write access indicated by the JNCB 55 will be stored as JNL data 61 separately from the JNCB 55. Each position of the JNL data 61 in the area where the JNL data 61 are stored is recorded as the address or the like in the specific field in the JNCB 55. With reference to the JNCB 55, the corresponding JNL data 61 can be loaded.

FIG. 3 represents an example of the JNCB management table according to the present invention.

A JNCB management table 27 includes at least four columns of a sequence number 12, a time stamp 15, a write address 18, and a JNL data address 21. The column of metadata required by the storage control software 102 can be added to the table.

The column 12 of the sequence number includes sequence numbers each as an integer value that can uniquely specify the order of the journal. In each of the embodiments of the present invention, there may be the case that partial duplication of the sequence numbers of the JNCB 55 is caused by rewriting of the sequence number. If such condition interferes with the operation of the storage control software 102, the column 9 of original sequence number may be added for recording the non-duplicated sequence number for reference from the storage control software 102.

The column 15 of the timestamp stores the time at which the storage control software 102 receives the I/O from the host computer 48. Normally, the real time is used as the time. It is also possible to use the monotonously increasing virtual time.

Data in the column 18 of the write address will be initialized in the logical address range in the volume 73 in which the JNL data 61 corresponding to the JNCB 55 are written.

The column 21 of JNL data address stores addresses of the JNL data 61 corresponding to the JNCB 55. If each piece of the JNL data 61 is loaded to a staging region 123 on the memory, the value indicates the address of the JNL data 61. Otherwise, the value may indicate the logical address in the JVOL.

Figure 4:
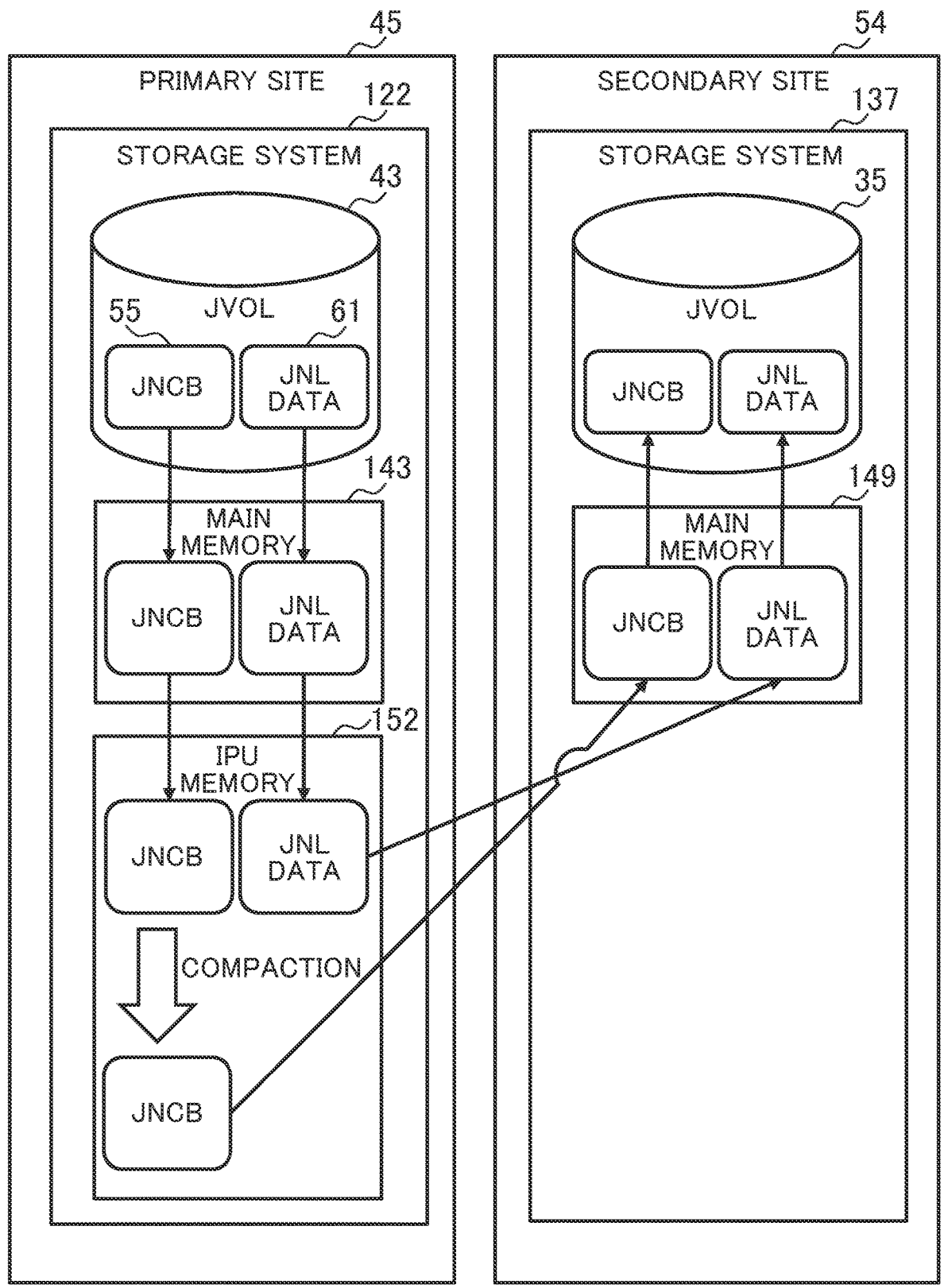
FIG. 4 illustrates a journal transfer path according to the first embodiment of the present invention.

FIG. 4 illustrates a journal transfer path according to the example.

Upon reception of the write access from the host computer 48, the JNCB 55 and the JNL data 61 are stored in the JVOL 43 of the storage system 122 of the primary site 45. In response to a journal transfer request (JNL read command) from the secondary site 54, the JNCB 55 and the JNL data 61 are transferred from the JVOL 43 of the primary site 45 to the JVOL 35 of the secondary site 54 by the following procedure.

Firstly, the JNCB 55 and the JNL data 61, which have been stored in the JVOL 43 of the primary site 45 are read into the working area in the main memory 143 of the primary site 45.

Secondly, the JNCB 55 and the JNL data 61, which have been read into the main memory 143 of the primary site 45 are transferred to the staging area 123 in the IPU package 82.

Thirdly, the IPU 86 executes a JNCB integration program 114 for executing compaction to the JNL data 61.

Fourthly, the JNCB 55 and the compaction-executed JNL data 61 are transferred from the IPU 86 of the primary site 45 to the main memory 149 of the secondary site 54.

Fifthly, the JNCB 55 and the JNL data 61 are written into the JVOL 35 of the secondary site from the main memory 149 of the secondary site 54. Then at arbitrary timing, a restore program 127 for journal is called for restoration.

Figure 5:
FIG. 5 illustrates an exemplified journal compaction operation according to the present invention.
Figure 5:
Figure 5:
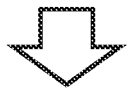
Figure 5:
Figure 5:

FIG. 5 illustrates an exemplified journal compaction operation according to the present invention.

In the present invention, the journal compaction is implemented through integration of the write accesses to the same address. FIG. 5 represents that the write access corresponding to JNCB[S2] has occurred subsequent to JNCB[S1].

A part in the latter half of the write address range of the journal of the JNCB[S1] is overwritten with the journal of the JNCB[S2]. At this time, a part of the JNL data 61 of the JNCB[S1] is cut to delete the duplicated part. This makes it possible to reduce the JNL data 61.

On the actual JVOL, the JNL data 61 are continuously arranged in the JVOL as FIG. 2 illustrates. Execution of compaction by partial deletion of the JNL data 61 may cause movement of large data, resulting in inefficient processing.

Figure 6:
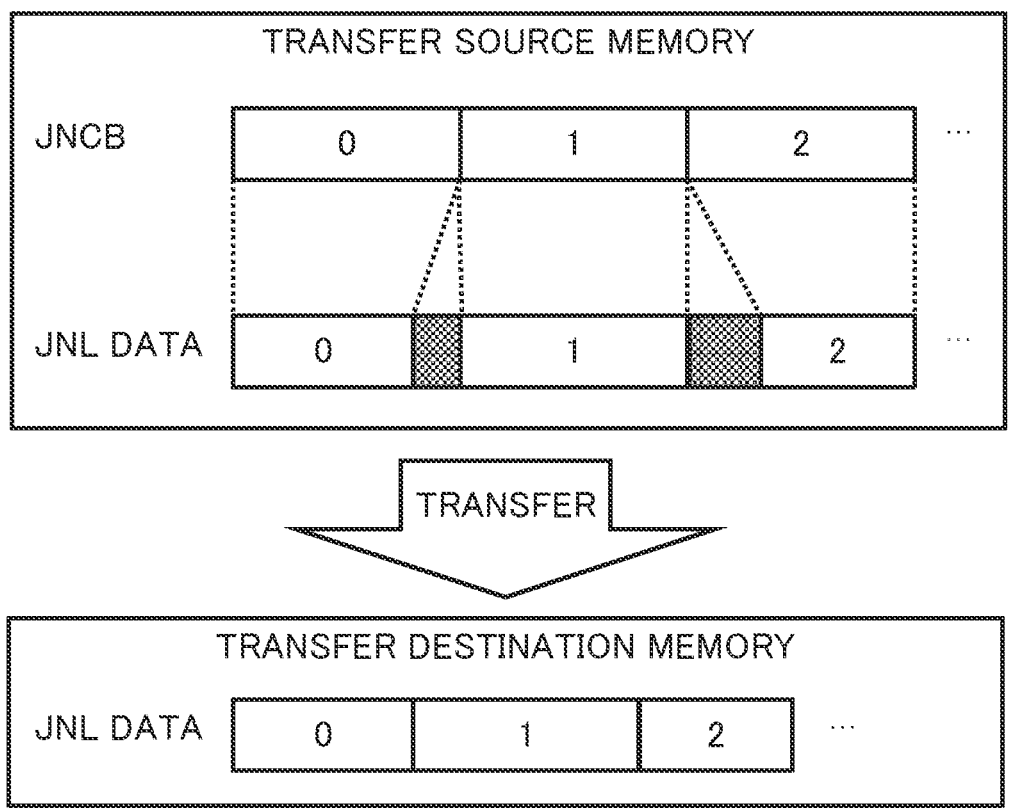
FIG. 6 illustrates an exemplary transfer method of compaction-executed JNL data according to the present invention.

In the present invention, as FIG. 6 illustrates, instead of moving the JNL data 61 for compaction, upon transfer of the JNL data 61 from the primary site to the secondary site after compaction to the JNCB 55, the deleted area which is not referred by the compaction-executed JNCB 55 is not transferred. Accordingly, the transfer amount is reduced.

Figure 7:
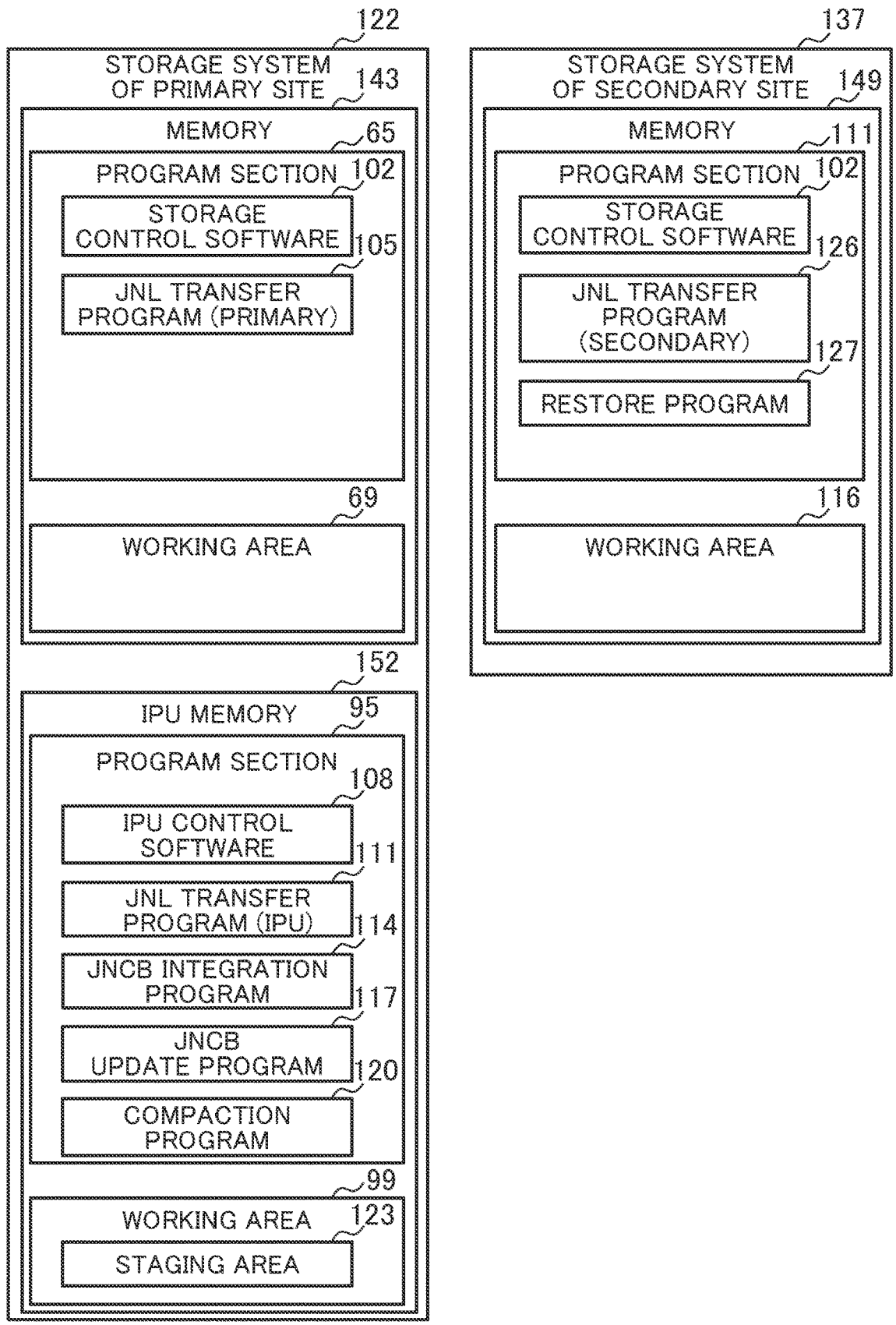
FIG. 7 is an inner block diagram of a controller memory according to the first embodiment of the present invention.

FIG. 7 is an inner block diagram of a controller memory according to the example.

The storage control software 102 is running on the main memory 143 of the primary site 45. In the example, in addition to the basic function of the storage control software 102 required for storage control, the program for transferring journal from the main memory 143 of the primary site 45 to the IPU memory 152 of the primary site 45 is installed as the JNL transfer program (primary) 105.

The storage control software 102 is running on the main memory 149 of the secondary site 54. In the example, in addition to the basic function of the storage control software 102 required for storage control, the program for receiving the journal from the IPU memory 152 of the primary site 45 to the main memory 149 of the secondary site 54 is installed as a JNL transfer program (secondary) 126.

The restore program 127 for restoring the received journal is running on the main memory 149 of the secondary site 54.

The IPU control software 108 is running on the IPU memory 152 of the primary site 45. In the example, in addition to the basic function of the IPU control software 108 required for controlling the IPU 86, the memory includes a JNL transfer program (IPU) 111 for transferring the journal from the main memory 143 of the primary site 45 to the IPU memory 152, the JNCB integration program 114 as an entry point of the journal compaction, a JNCB update program 117 to be called by the JNCB integration program 114, and a compaction program 120 to be called by the JNCB update program 117.

The working area in the IPU memory 152 of the primary site 45 secures the staging area 123 where compaction is executed to the JNCB 55.

Figure 8:
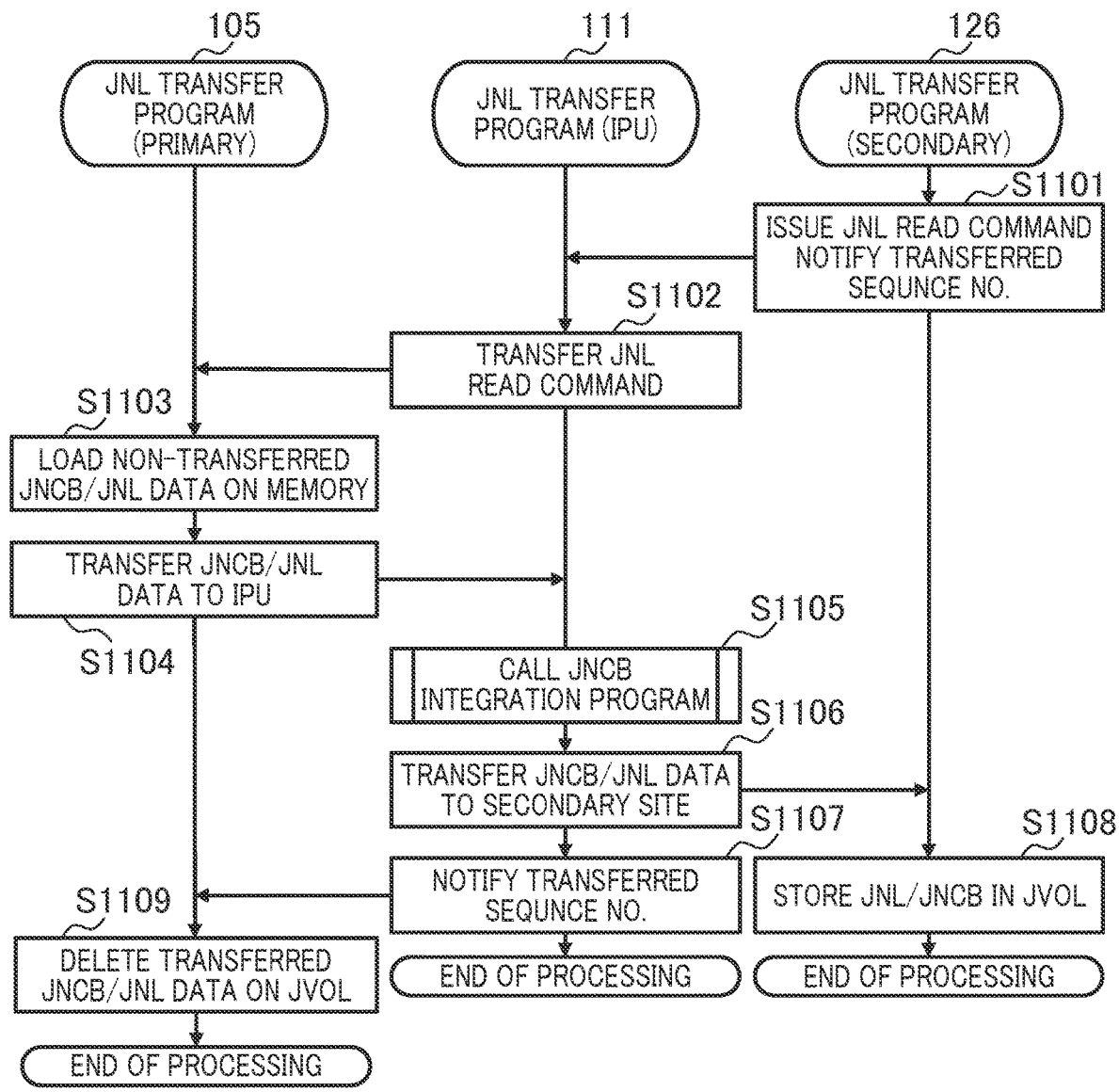
FIG. 8 is a flowchart of journal transfer from the primary site to the secondary site according to the first embodiment of the present invention.

FIG. 8 is a flowchart of journal transfer from the primary site to the secondary site according to the example.

In step S1101, the CPU 104 of the secondary site 54 issues a JNL read command to the IPU 86 of the primary site 45. The JNL read command includes the transferred sequence number.

In step S1102, the IPU 86 installed in the storage system 122 of the primary site transfers the JNL read command which has been received in step S1101 to the CPU 101 in the storage system.

In step S1103, the CPU 101 of the primary site lists non-transferred sequence numbers with reference to the transferred sequence numbers included in the received JNL read command. Normally, the numbers to be listed are in the range from the number subsequent to the latest sequence number which has been transferred to the secondary site to the latest sequence number stored in the JVOL 43. The CPU 101 loads the JNCB 55 and the JNL data 61 corresponding to the non-transferred sequence number on the main memory 143 from the JVOL 43.

In step S1103, if the JVOL 43 stores the JNCB 55 or the JNL data 61 in the compressed state, the compressed data are expanded using the accelerator or the like appropriately.

In step S1104, the CPU 101 transfers the JNCB 55 and the JNL data 61, which have been loaded on the main memory 143 to the IPU 86.

If all the JNCB 55 and the JNL data 61 corresponding to the non-transferred sequence numbers are transferred to the IPU 86 in step S1104, it may be in the case that capacity of the staging area 123 becomes insufficient. In order to prevent the insufficiency, the IPU 86 of the primary site 45 may be configured to notify the CPU 101 of available capacity of the staging area 123 simultaneously with transfer of the JNL read command to the CPU 101 in step S1102. In this case, in step S1104, the CPU 101 transfers only the data storable in the staging area 123 among those of the JNCB 55 and the JNL data 61 corresponding to the non-transferred sequence numbers.

In step S1105, the IPU 86 calls the JNCB integration program 114 for executing journal compaction to the JNCB 55 and the JNL data 61, which have been transferred from the CPU 101.

In step S1106, the IPU 86 transfers the compaction-executed JNCB 55 and JNL data 61 to the secondary site. It is possible to apply such processing as compression and encryption to the JNCB 55 and the JNL data 61 upon data transfer to the secondary site.

In step S1107, the IPU 86 of the primary site 45 notifies the CPU 101 of the primary site 45 of the latest sequence number which has been transferred to the secondary site.

In step S1108, the CPU 104 of the secondary site 54 stores the JNCB 55 and the JNL data 61, which have been received in the JVOL 35 of the secondary site.

In step S1109, based on the transferred sequence number notified from the IPU 86, the CPU 101 of the primary site 45 deletes the JNCB 55 and the JNL data 61, which have been transferred to the secondary site from the JVOL 43. The CPU 101 of the primary site 45 may be configured to hold the JNCB 55 or the JNL data 61 undeleted for use by other functions in response to the request upon implementation.

Figure 9:
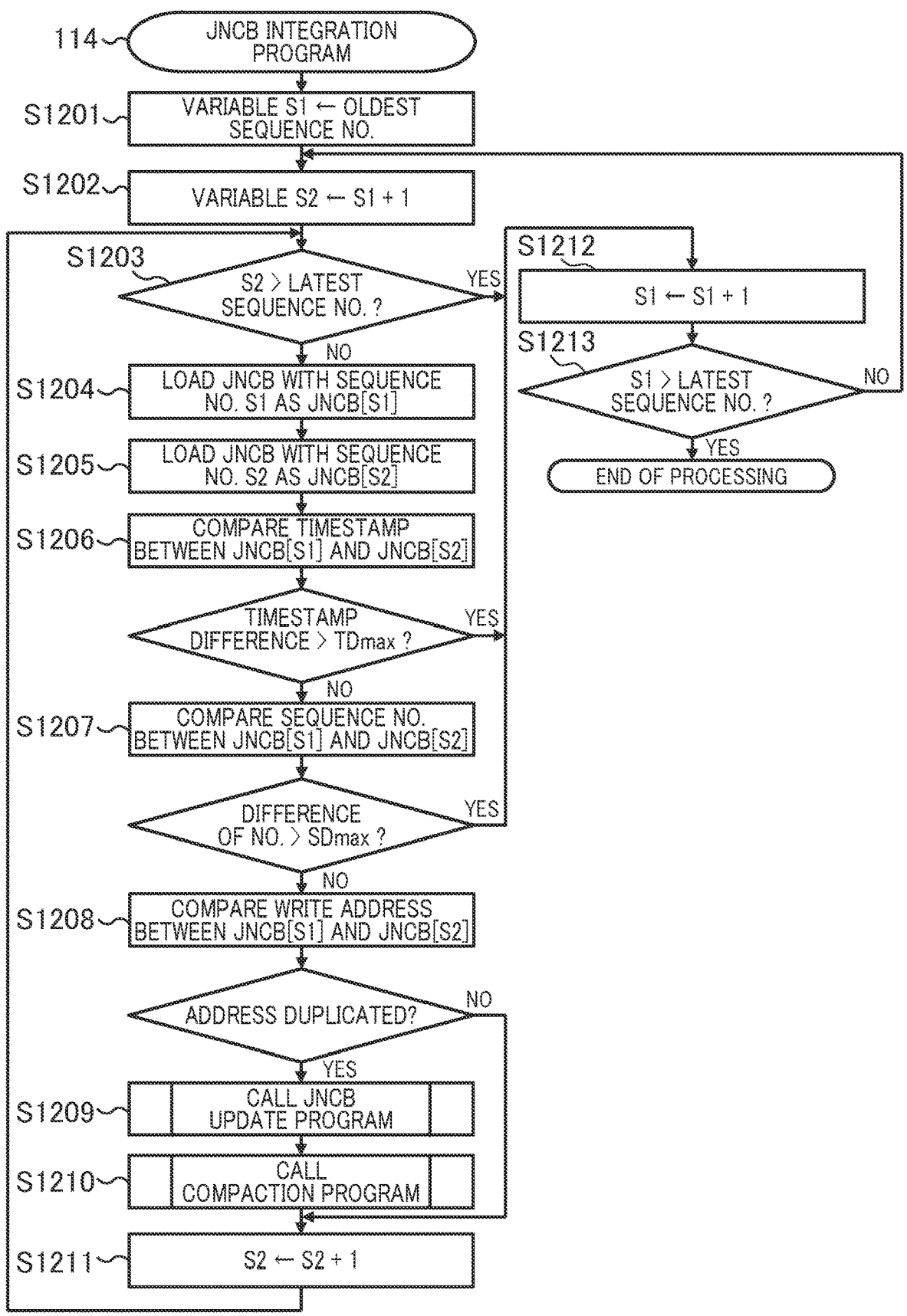
FIG. 9 is a flowchart for executing JNCB integration program according to the present invention.

FIG. 9 is a flowchart for executing the JNCB integration program according to the present invention.

In step S1201, the JNCB integration program 114 substitutes the oldest sequence number of the JNCB 55 to be compaction-executed for a variable S1.

In step S1202, the JNCB integration program 114 initializes a variable S2 by adding 1 to the variable S1, that is, S1+1.

In step S1203, the JNCB integration program 114 compares the variable S2 with the latest sequence number of those in the staging area 123. If the variable S2 is larger than the latest sequence number, the program proceeds to step S1212. Otherwise, the program proceeds to step S1204.

In step S1204, the JNCB integration program 114 loads the JNCB 55 with the sequence number that is the same as the variable S1. The above-described JNCB 55 will be referred to as the JNCB[S1] hereinafter.

In step S1205, the JNCB integration program 114 loads the JNCB 55 with the sequence number that is the same as the variable S2. The above-described JNCB 55 will be referred to as the JNCB[S2] hereinafter.

In step S1206, the JNCB integration program 114 compares the timestamps between the JNCB[S1] and the JNCB [S2]. If the difference of the timestamp is smaller than the value defined as a variable TDmax, the program proceeds to step S1207. Otherwise, the program proceeds to step S1212. If there is no timestamp or the invalid timestamp in at least one of those data of the JNCB 55, the program proceeds to step S1212.

In step S1207, the JNCB integration program 114 compares the sequence numbers between the JNCB[S1] and the JNCB[S2]. If the difference of the sequence number is smaller than the value defined as the variable SDmax, the program proceeds to step S1208. Otherwise, the program proceeds to step S1212.

In step S1208, the JNCB integration program 114 compares the write address ranges between the JNCB[S1] and the JNCB[S2]. If there is duplication between the write address ranges, the program proceeds to step S1209. Otherwise, the program proceeds to step S1211.

In step S1209, the JNCB integration program 114 calls the JNCB update program 117. At this time, the program passes the variables S1 and S2 as arguments to the JNCB update program 117.

In step S1210, the JNCB integration program 114 calls the compaction program 120. At this time, the program passes the variables S1 and S2 as arguments to the compaction program 120.

In step S1211, the JNCB integration program 114 increments the variable S2.

In step S1212, the JNCB integration program 114 increments the variable S1.

In step S1213, the JNCB integration program 114 compares the variable S1 with the latest sequence number in the staging area 123. If the variable S1 is larger than the latest sequence number, execution of the JNCB integration program is terminated. Otherwise, the program proceeds to step S1202.

Figure 10:
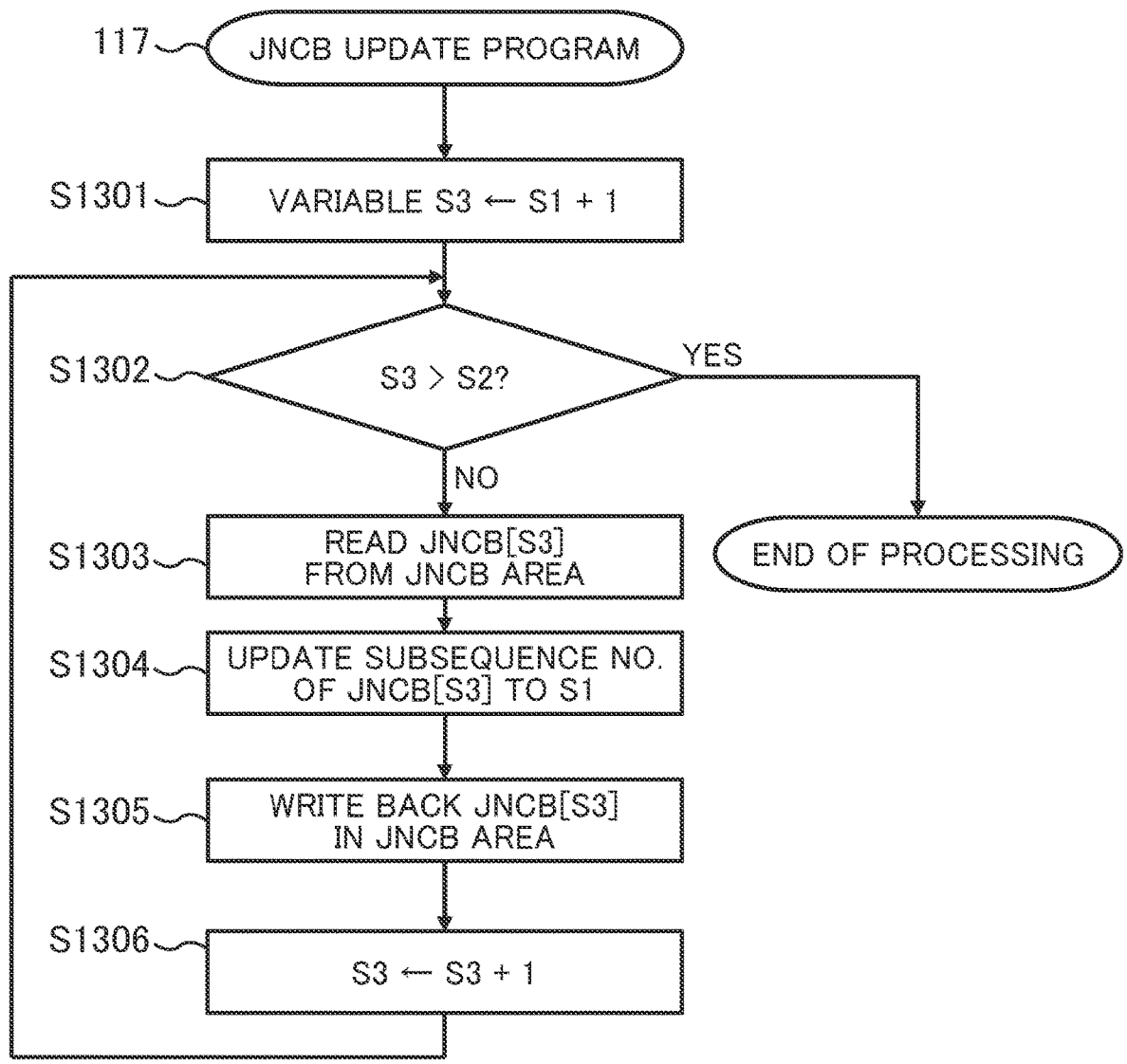
FIG. 10 is a flowchart for executing a JNCB update program according to the present invention.

FIG. 10 is a flowchart for executing the JNCB update program according to the present invention.

In step S1301, the JNCB update program 117 initializes a variable S3 by adding 1 to the variable S1, that is, S1+1.

In step S1302, the JNCB update program 117 makes a comparison between the variables S3 and S2. If the variable S3 is larger than the variable S2, execution of the JNCB update program 117 is terminated. Otherwise, the program proceeds to step S1303.

In step S1303, the JNCB update program 117 loads the JNCB 55 with the sequence number that is the same as the variable S3 from the staging area 123.

In step S1304, the JNCB update program 117 updates the sequence number of the JNCB 55 which has been loaded in step S1303 to the same value as the variable S1.

In step S1305, the JNCB update program 117 writes back the JNCB 55 which has been updated in step S1304 in the staging area 123.

In step S1306, the JNCB update program 117 increments the variable S3.

Figure 11:
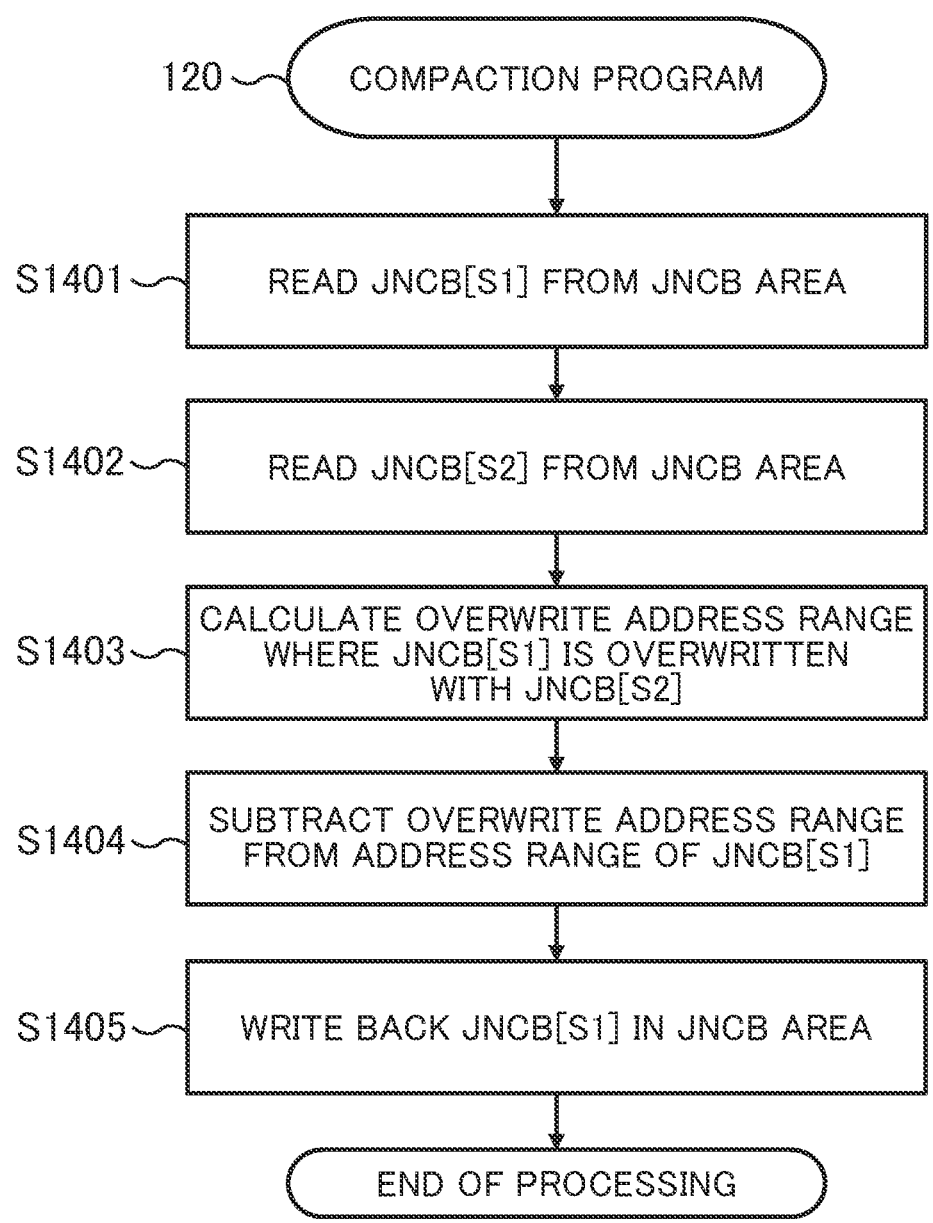
FIG. 11 is a flowchart for executing a compaction program according to the present invention.

FIG. 11 is a flowchart for executing the compaction program according to the present invention.

In step S1401, the compaction program 120 reads the JNCB 55 with the sequence number that is the same as the variable S1 from the staging area 123. The above-described JNCB 55 will be referred to as the JNCB[S1].

In step S1402, the compaction program 120 reads the JNCB 55 with the sequence number that is the same as the variable S2 from the staging area 123. The above-described JNCB 55 will be referred to as the JNCB[S2].

In step S1403, the compaction program 120 calculates a part of the write address range of the JNCB[S1], which is duplicated with the write address range of the JNCB[S2].

In step S1404, the compaction program 120 subtracts the duplicated range calculated in step S1403 from the write address range of the JNCB[S1] for updating.

In step S1405, the compaction program 120 writes back the JNCB[S1] updated in step S1404 in the staging area 123.

Figure 12:
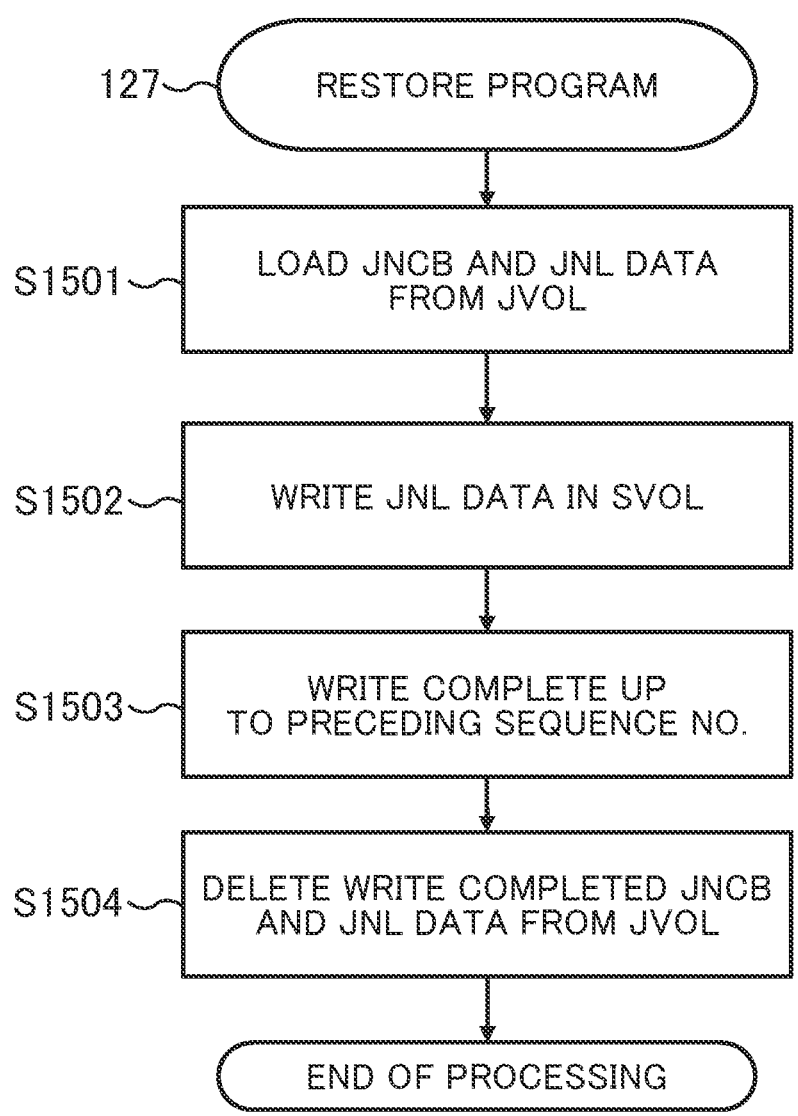
FIG. 12 is a flowchart for journal restoration executed by the CPU in the secondary site according to the present invention.

FIG. 12 is a flowchart for journal restoration executed by the CPU in the secondary site 54 according to the present invention. In accordance with the flow, the CPU 104 of the secondary site 54 timely restores the journal after receiving the JNCB 55 and the JNL data 61 from the primary site.

In step S1501, the CPU 104 of the secondary site 54 loads the JNCB 55 and the JNL data 61, which have been received from the primary site 45 from the JVOL 35.

In step S1502, the CPU 104 of the secondary site 54 writes the JNL data 61 in the SVOL 38 in accordance with the information of the JNCB 55.

In step S1503, the CPU 104 of the secondary site 54 completes writing up to the sequence number preceding to the one written in step S1502, and updates the transferred sequence number. Upon next issue of the JNL read command, the last sequence number at the completion of writing in step S1503 is transmitted as the transferred sequence number.

In step S1504, if data of the JNCB 55 or the JNL data 61 corresponding to the write-completed sequence numbers in step S1503 are left in the JVOL 35, the CPU 104 of the secondary site 54 deletes those data from the JVOL 35 for releasing the area. For the purpose of reducing frequency of the access to the JVOL 35, the JNCB 55 and the JNL data 61 can be deleted in every processing of the certain volume of the sequence numbers rather than deleted in every processing of each of the sequence numbers.

Second Example

A second embodiment of the present invention has the same system configuration as the one illustrated in FIG. 1 except a part of the program configuration.

Figure 13:
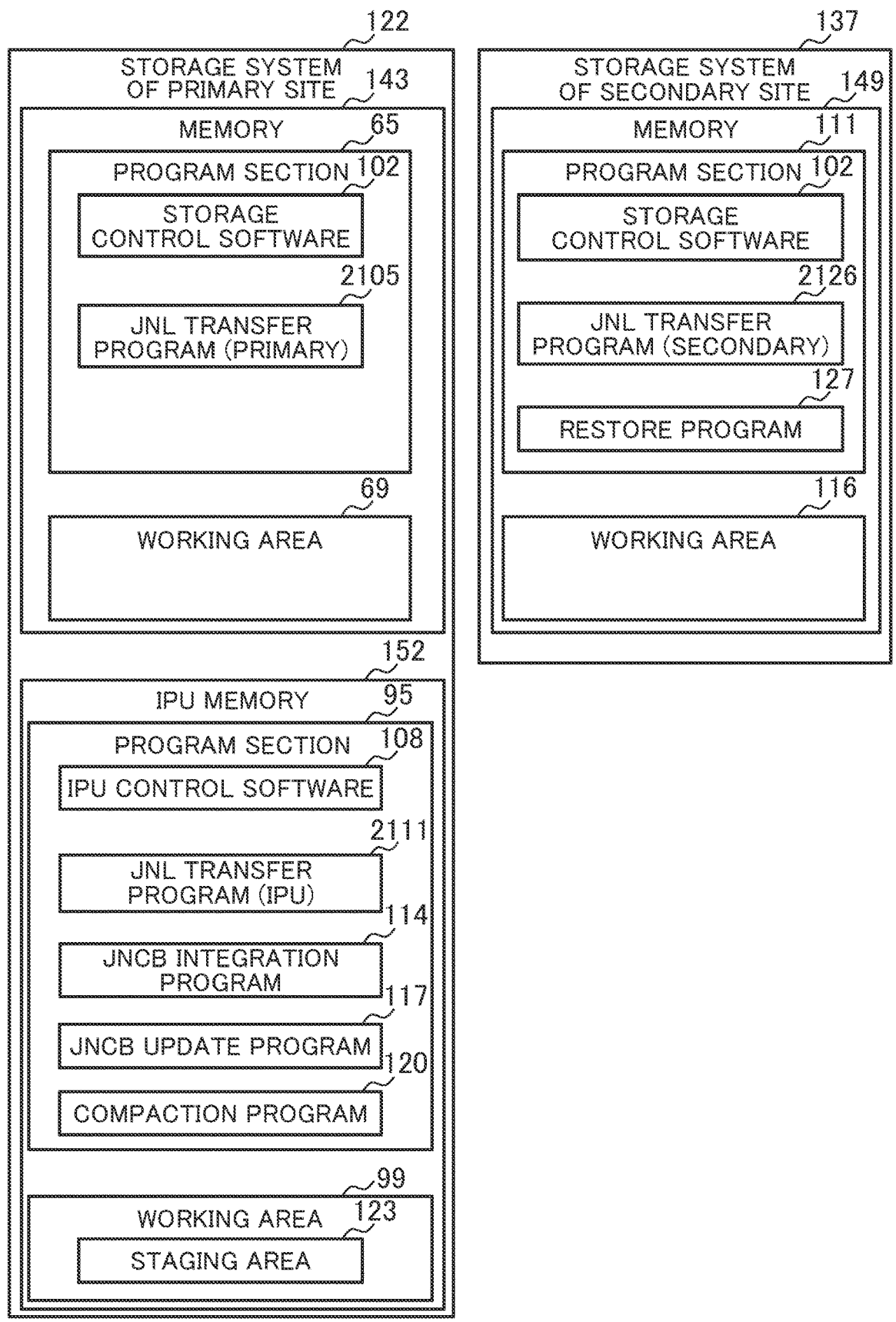
FIG. 13 is an inner block diagram of the controller memory according to a second embodiment of the present invention.

FIG. 13 is an inner block diagram of a controller memory according to the example.

The program of this example is configured differently from the first embodiment in that the JNL transfer program (primary) 105 running on the CPU 101 of the primary site 45 is replaced with a JNL transfer program (primary) 2105, the JNL transfer program (IPU) 111 running on the IPU 86 of the primary site 45 is replaced with a JNL transfer program (IPU) 2111, and the JNL transfer program (secondary) 126 running on the CPU 104 of the secondary site 54 is replaced with a JNL transfer program (secondary) 2126.

Figure 14:
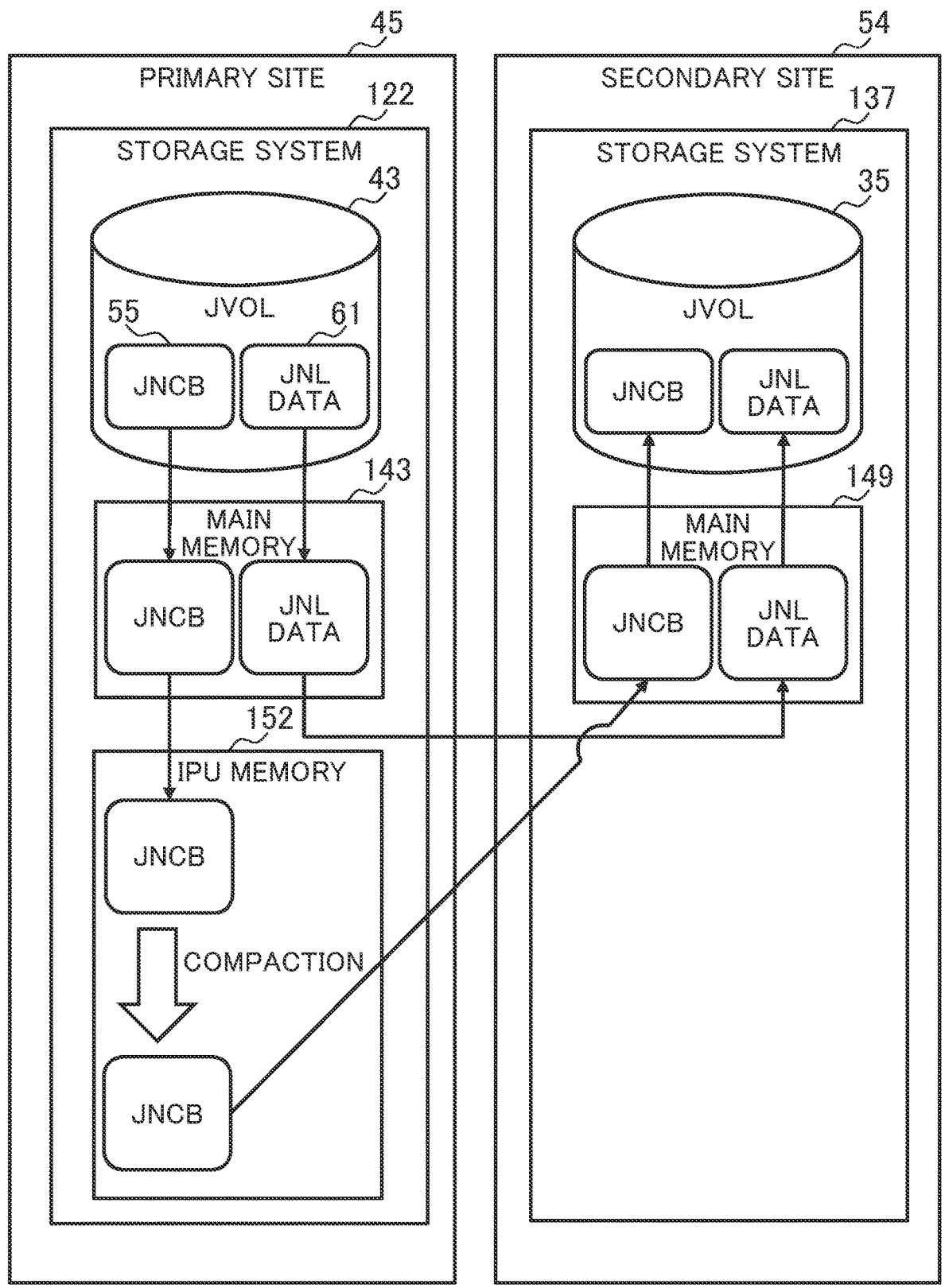
FIG. 14 illustrates a journal transfer path according to the second embodiment of the present invention.

FIG. 14 illustrates a journal transfer path according to the example.

This example is different from the first embodiment in that the JNL data 61 are transferred to the main memory 149 of the secondary site 54 directly from the main memory 143 of the primary site rather than transferred to the IPU memory 152. The direct transfer of the JNL data 61 makes it possible to reduce the required size of the IPU memory 152 as small as possible.

The direct transfer of the JNL data 61 as illustrated in FIG. 14 requires the mechanism that allows the IPU 86 to control the data transfer to the main memories between the primary and the secondary sites. Although the mechanism is not described herein, typically, such technique as RDMA (Remote Direct Memory Access) may be employed.

Figure 15:
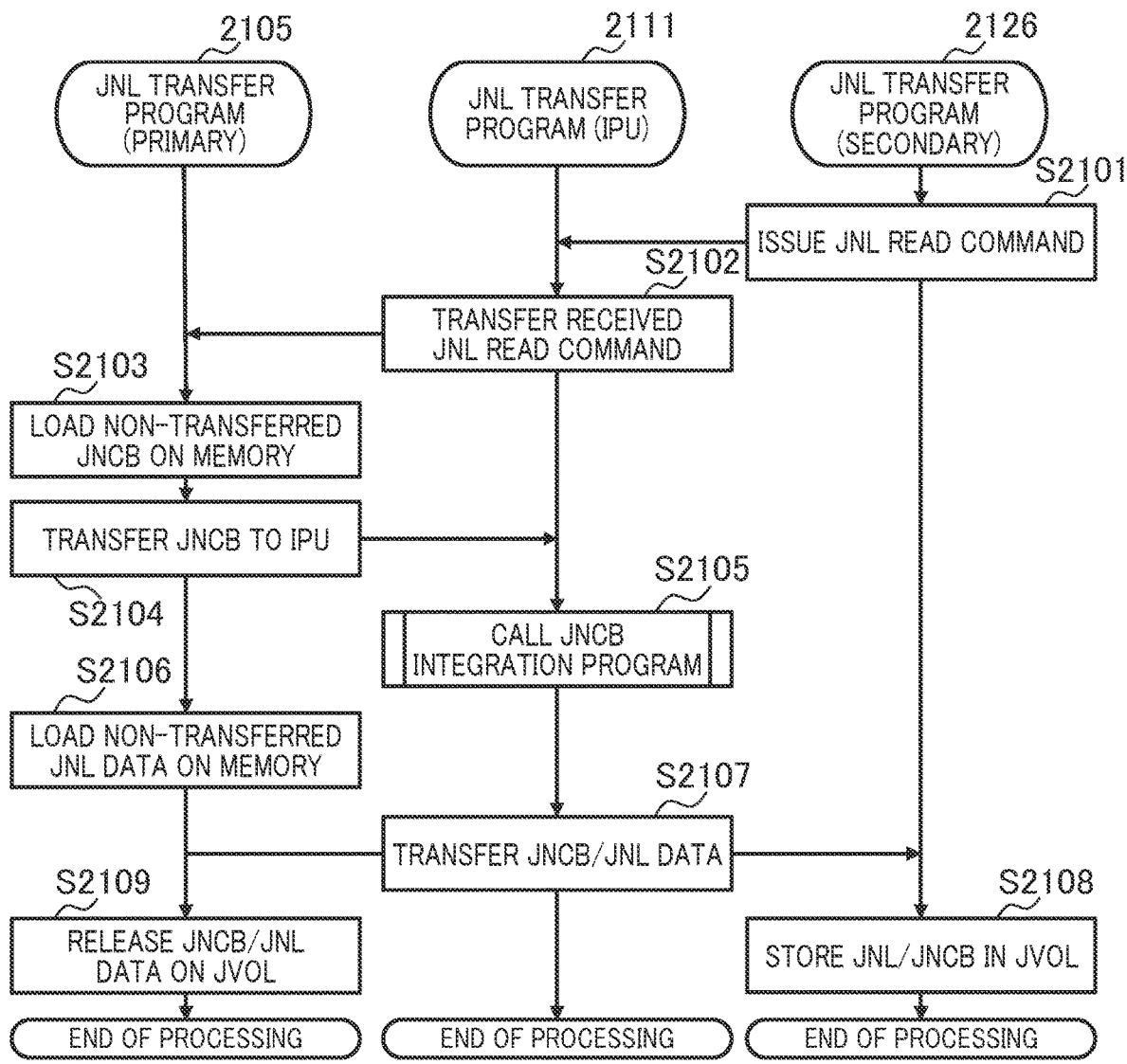
FIG. 15 is a flowchart for executing journal transfer from the primary site to the secondary site according to the second embodiment of the present invention.

FIG. 15 is a flowchart for executing journal transfer from the primary site to the secondary site according to the example.

In step S2101, the CPU 104 of the secondary site 54 issues the JNL read command to the IPU 86 of the primary site 45. The JNL read command includes the sequence number which has been received by the CPU 104 of the secondary site 54.

In step S2102, the IPU 86 of the primary site 45 transfers the JNL read command which has been received in step S2101 to the CPU 101 of the primary site 45.

In step S2103, based on the transferred sequence number notified from the IPU 86 in step S2102, the CPU 101 of the primary site 45 specifies the sequence number to be transferred, and loads the corresponding JNCB 55 on the main memory 143 from the JVOL 43. The JNL data 61 are kept stored in the JVOL 43. If the JVOL 43 stores the JNCB 55 in the compressed state, the compressed data are expanded using the accelerator or the like appropriately.

In step S2104, the CPU 101 of the primary site 45 transfers the JNCB 55 loaded on the main memory 143 in step S2102 to the IPU 86 of the primary site 45. The IPU 86 of the primary site 45 stores the transferred JNCB 55 in the staging area 123.

In step S2105, the IPU 86 of the primary site 45 calls the JNCB integration program 114 for executing compaction to the JNCB 55.

In step S2106, the CPU 101 of the primary site 45 loads the JNL data 61 corresponding to the sequence number to be transferred on the main memory 143 from the JVOL 43. If the JVOL 43 stores the JNL data 61 in the compressed state, the compressed data are expanded using the accelerator or the like appropriately.

In step S2107, the IPU 86 of the primary site 45 transfers the compaction-executed JNCB 55 to the CPU 104 of the secondary site 54, and simultaneously, transfers the JNL data 61 to the main memory 149 of the secondary site 54 from the main memory 143 of the primary site 45. It is possible to execute such processing as compression and encryption to the JNCB 55 and the JNL data 61 upon data transfer to the secondary site.

In step S2108, the CPU 104 of the secondary site 54 stores the JNCB 55 and the JNL data 61, which have been received in step S2107 in the JVOL 35.

In step S2109, the CPU 101 of the primary site 45 deletes the JNCB 55 and the JNL data 61, which have been transferred from the JVOL 43.

Third Example

Figure 16:
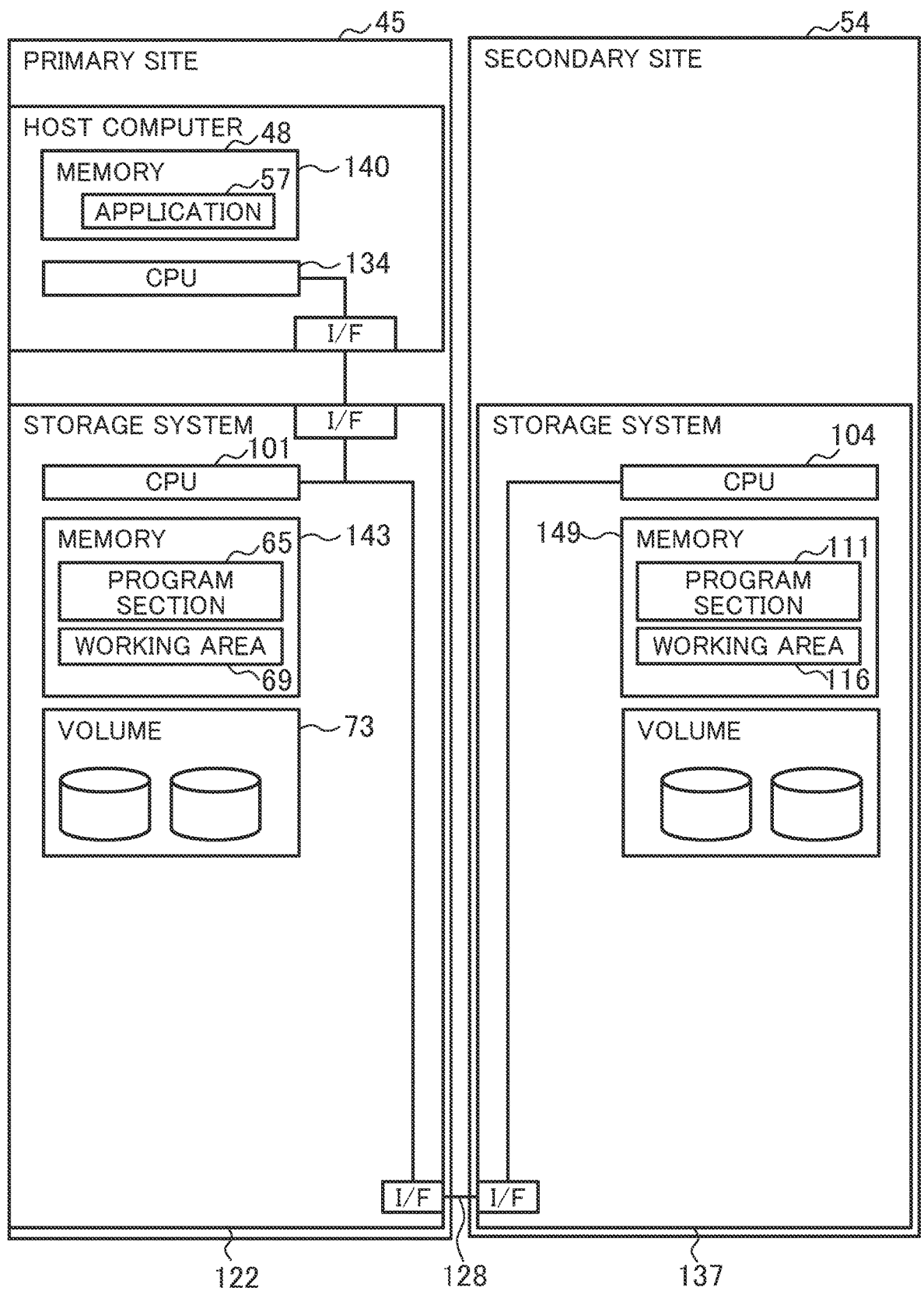
FIG. 16 is a block diagram illustrating an exemplified configuration of an information system according to a third embodiment of the present invention.

FIG. 16 is a block diagram illustrating an exemplified configuration of an information system according to an example.

The system of this example is configured differently from those of the first and the second embodiments in that the IPU 86 is not provided. As the IPU 86 is not provided, the CPU 101 of the primary site 45 executes the process to be carried out by the IPU 86 in the first and the second embodiments.

Figure 17:
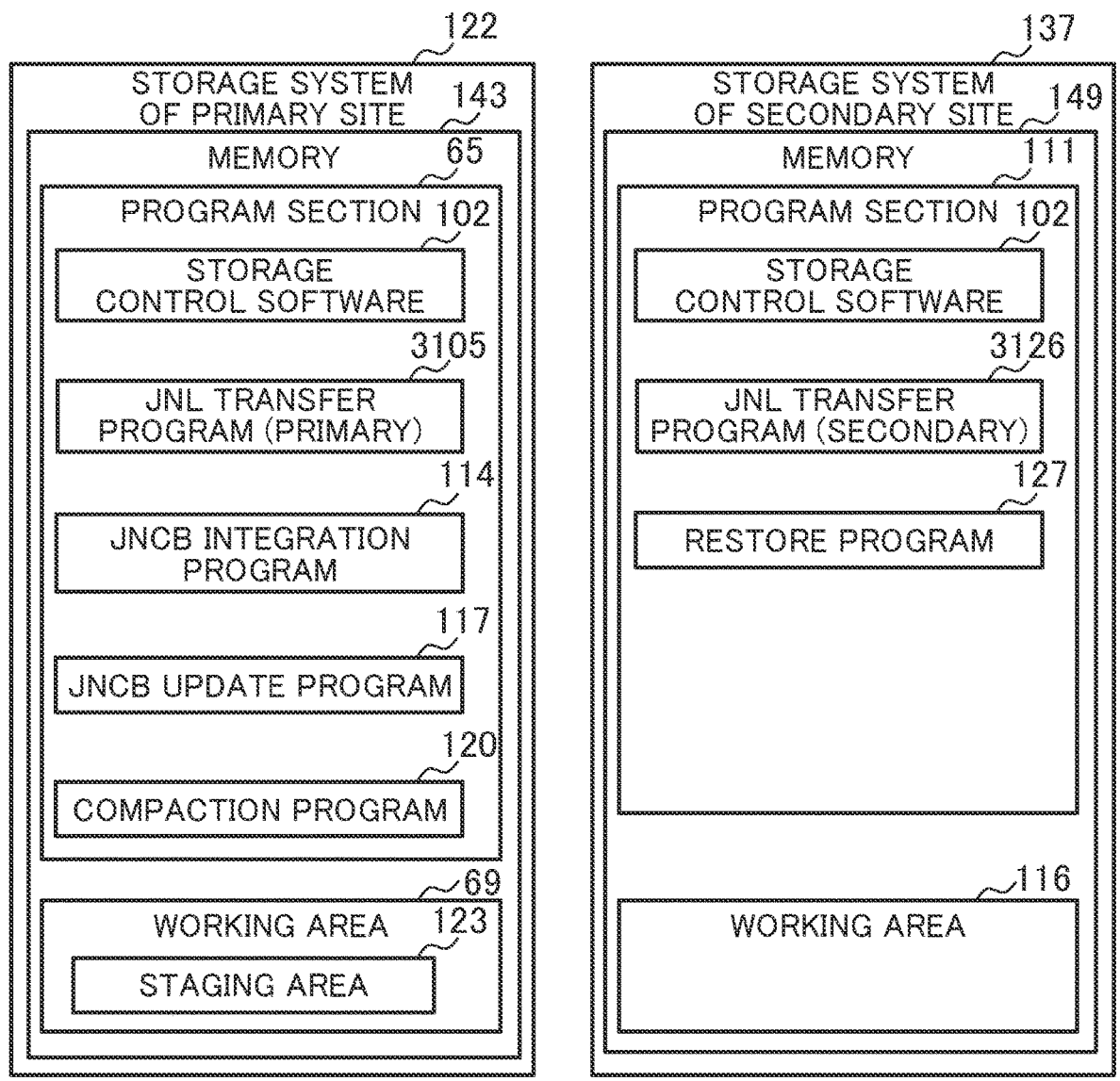
FIG. 17 is an inner block diagram of the controller memory according to the third embodiment of the present invention.

FIG. 17 is an inner block diagram of the controller memory according to the example.

In this example, the CPU 101 of the primary site 45 executes the process that involves journal compaction to be executed by the IPU 86 in the first and the second embodiments. Accordingly, the JNCB integration program 114, the JNCB update program 117, and the compaction program 120 are installed on the main memory 143 of the primary site 45 without changing contents thereof. The staging area 123 as the working area for compaction is secured on the main memory 143 of the primary site 45 instead of the IPU memory 152.

A JNL transfer program (primary) 3105 and a JNL transfer program (secondary) 3126 each executing journal transfer are installed in the main memories of the primary site and the secondary site, respectively.

Figure 18:
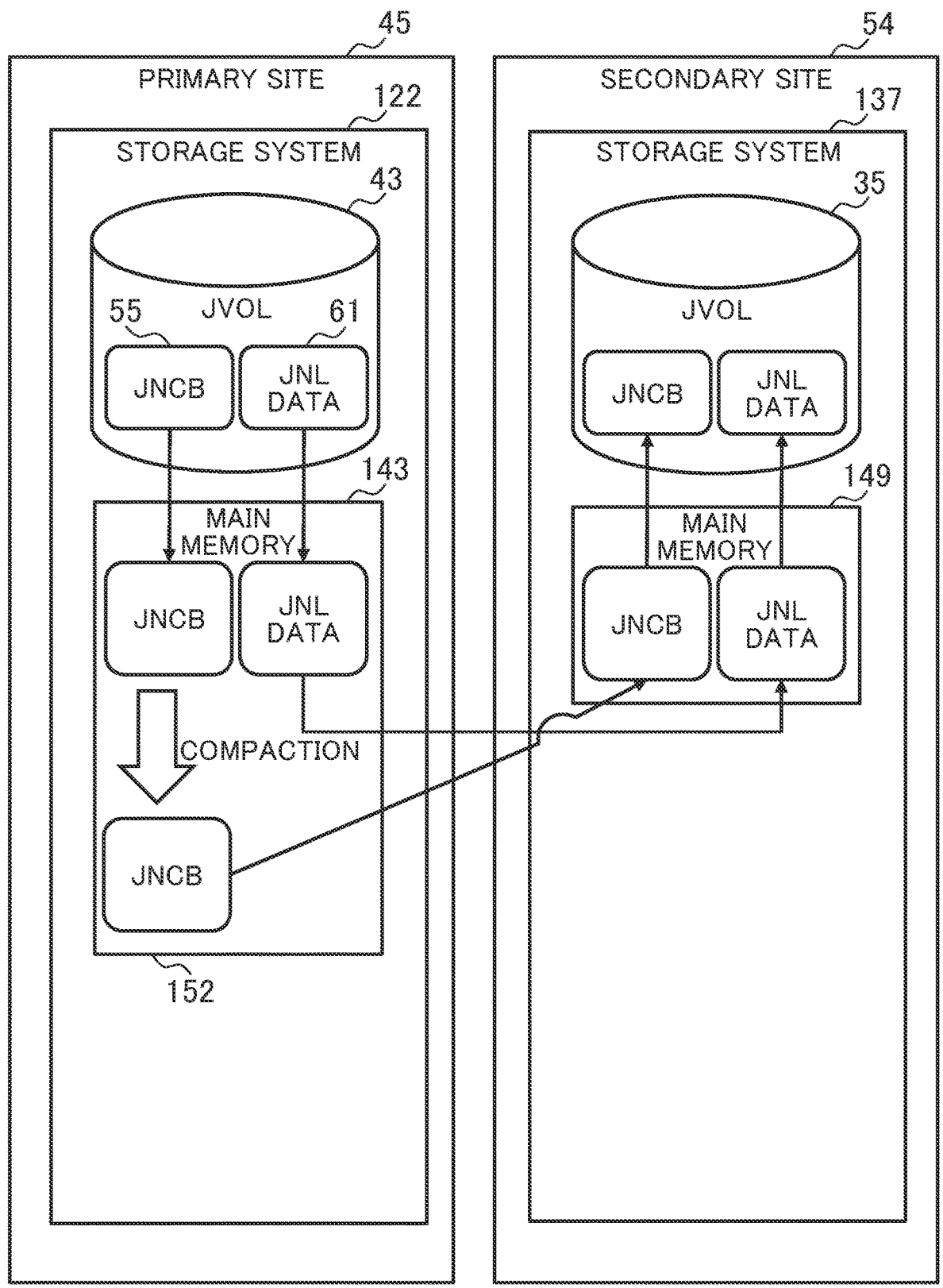
FIG. 18 illustrates a journal transfer path according to the third embodiment of the present invention.

FIG. 18 illustrates a journal transfer path according to the example.

In this example, the IPU 86 is not provided. After the CPU 101 of the primary site 45 executes the respective processing steps on the main memory 143 of the primary site 45, the JNCB 55 and the JNL data 61 are directly transferred from the main memory 143 of the primary site 45 to the main memory 149 of the secondary site 54.

Figure 19:
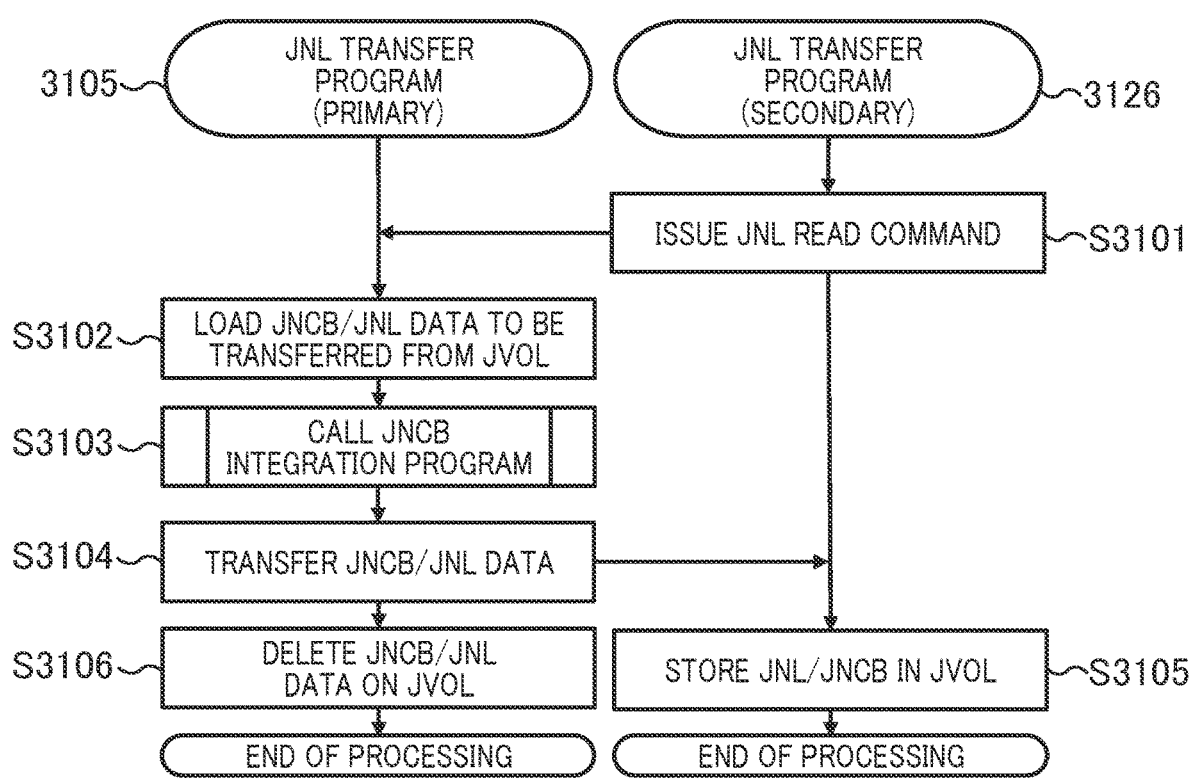
FIG. 19 is a flowchart for executing journal transfer from the primary site to the secondary site according to the third embodiment of the present invention.

FIG. 19 is a flowchart for executing journal transfer from the primary site to the secondary site according to the example.

In step S3101, the CPU 104 of the secondary site 54 issues the JNL read command to the CPU 101 of the primary site 45.

In step S3102, based on the transferred sequence number included in the JNL read command, the CPU 101 of the primary site 45 determines the sequence numbers to be transferred, and loads the JNCB 55 and the JNL data 61 corresponding to those numbers on the main memory 143 from the JVOL 43.

In step S3102, if the JVOL 43 stores the JNCB 55 or the JNL data 61 in the compressed state, the compressed data are expanded using the accelerator or the like appropriately.

In step S3103, the CPU 101 of the primary site 45 calls the JNCB integration program 114 for executing compaction to the JNCB 55.

In step S3104, the CPU 101 of the primary site 45 transfers the JNCB 55 and the JNL data 61, which have been loaded on the main memory 143 in step S3102 to the main memory 149 of the secondary site 54. It is possible to apply such processing as compression and encryption to the JNCB 55 and the JNL data 61 upon data transfer to the secondary site.

In step S3105, the CPU 104 of the secondary site 54 stores the JNCB 55 and the JNL data 61, which have been received in step S3104 in the JVOL 35.

In step S3106, the CPU 101 of the primary site 45 deletes the JNCB 55 and the JNL data 61, which have been transferred from the JVOL 43.

The information processing system includes a first storage system 122 for supplying a primary site, and a second storage system 137 for supplying a secondary site. The first storage system 122 is allowed to execute replication by transferring a processing history of a data volume of the first storage system 122 to the second storage system 137, and to transfer multiple processing histories collectively. The first storage system integrates histories of multiple write accesses included in the multiple processing histories to be collectively transferred, which are duplicatedly addressed on the data volume for transfer. The configuration and operation of the system ensures to satisfy requirements of RPO/transfer amount at the level substantially equivalent to that of the snapshot replication while minimizing change upon implementation and burden of the configuration maintenance on the user.

In the system, the integration is executed by detecting the multiple duplicatedly addressed write accesses on the data volume, and deleting multiple duplicatedly addressed write contents through the multiple write accesses as invalid contents except the content of the last write access. Contents of the last write access and the write access at a non-duplicated address are transferred to reduce data amount.

Specifically, the first storage system reduces the data amount by managing the processing history with respect to journal metadata and a journal main body separately, applying the integration of the multiple write access histories to the journal metadata, and transferring the journal main body except a range which is not referred by the journal metadata upon transfer.

It is possible to reduce the data amount at low loads.

Specifically, the first storage system 122 may be configured to include a first processing unit for executing a processing to the data volume, and a second processing unit for communication with the second storage system. The second processing unit may be configured to execute the integration of the write access histories.

The above-described configuration allows effective use of the processing unit (IPU package) provided for replication, resulting in reduced transfer amount.

The first storage system 122 may also be configured to include a first processing unit for executing a processing to the data volume and communication with the second storage system, and a second processing unit for executing the integration of the write access histories.

The above-described configuration allows allocation of the dedicated processing unit for integration of the journal so as to avoid influence of the load of integration on other processings.

The first storage system 122 executes the integration of the write access histories, and transfer of the processing history in response to a request from the second storage system 137.

The configuration and operation of the system make the degree of deleted data size variable in accordance with the timing for receiving the request from the second storage system 137. It is possible to dynamically vary the RPO/transfer amount in the range from the normal continuous replication to the level substantially equivalent to that of the snapshot replication while minimizing change upon implementation and burden of the configuration maintenance on the user.

The first storage system 122 handles all the duplicatedly addressed write accesses on the data volume regarded as those coincidently occurred at the first write access timing. Therefore, it is possible to prevent data omission in the integrated accesses.

The present invention includes various kinds of modifications without being limited to the above-described examples. For example, the examples have been described in detail for readily understanding of the present invention. Therefore, it is not necessarily limited to be configured to have all the components as described above. It is also possible to remove, replace, and add the structure from, with and to those of each of the examples.

The respective structures, functions, processing sections, processing means and the like may be implemented through hardware by designing those elements partially or entirely using the integrated circuit. The respective functions of the examples may also be implemented through the program code of software. In this case, the computer is provided with the storage medium having the program codes recorded therein so that the processor of the computer reads the program code stored in the storage medium. In this case, the program code read from the storage medium serves to implement functions of the foregoing examples. Accordingly, the program code itself and the storage medium that stores such code form the present invention. The storage medium for providing the program code includes, for example, the flexible disc, CD-ROM, DVD-ROM, hard disk, SSD (Solid State Drive), optical disc, magneto-optical disk, CD-R, magnetic tape, non-volatile memory card, and ROM.

The program code that implements the functions as specified in the examples may be installed through the wide-range program or the script language, for example, the assembler, C/C++, perl, Shell, PHP, and Java®.

The foregoing examples show the control lines and information lines which are considered as necessary for the explanation. However, they do not necessarily indicate all the control lines and the information lines of the product. All the structures may be interconnected with one another.

What is claimed is:

1. An information processing system comprising:
a first storage system for supplying a primary site; and
a second storage system for supplying a secondary site,
wherein the first storage system is configured to:
execute replication by transferring a processing history of a data volume of the first storage system to the second storage system,
transfer multiple processing histories collectively, and
integrate histories of multiple write accesses included in the multiple processing histories to be collectively transferred, which are duplicatedly addressed on the data volume for transfer,
wherein the processing history is stored in a journal volume of the first storage system and includes a data block which stores a management table and stores, separately and in a separate area from the management table, a write data area storing write data,
wherein the management table stores a plurality of write access entries and each entry includes a sequence number indicating an order of a write access from a host, a timestamp in which the write access is received, and a write address indicating an address where the corresponding write data are stored in the write area,
wherein the integration is of multiple write access entries of the management table, and
wherein the transferring of the processing history includes transferring the write data in the write area except an address range that is not included in the write address of the management table upon transfer.

2. The information processing system according to claim 1,
wherein the integration is executed by detecting the multiple duplicatedly addressed write accesses on the data volume, and deleting multiple duplicatedly addressed write contents through the multiple write accesses as invalid contents except the content of the last write access, and
wherein contents of the last write access and the write access at a non-duplicated address are transferred to reduce data amount.

3. The information processing system according to claim 1,
wherein: the first storage system includes a first processing unit for executing a processing to the data volume, and a second processing unit for communication with the second storage system, and
wherein the second processing unit executes the integration of the write access histories.

4. The information processing system according to claim 1,
wherein the first storage system includes a first processing unit for executing a processing to the data volume and communication with the second storage system, and a second processing unit for executing the integration of the write access histories.

5. The information processing system according to claim 1,
wherein the first storage system executes the integration of the write access histories, and transfer of the processing history in response to a request from the second storage system.

6. The information processing system according to claim 1,
wherein the first storage system handles all the duplicatedly addressed write accesses on the data volume regarded as those coincidently occurred at a first write access timing.

7. A data transfer method for a first storage system that supplies a primary site, the first storage system being connected to a second storage system that supplies a secondary site, the method comprising:
executing replication by transferring a processing history of a data volume of the first storage system to the second storage system, allowing collective transfer of multiple processing histories; and
integrating histories of multiple write accesses included in the multiple processing histories to be collectively transferred, which are duplicatedly addressed on the data volume prior to transfer of the processing history,
wherein the processing history is stored in a journal volume of the first storage system and includes a data block which stores a management table and stores, separately and in a separate area from the management table, a write data area storing write data,
wherein the management table stores a plurality of write access entries and each entry includes a sequence number indicating an order of a write access from a host, a timestamp in which the write access is received, and a write address indicating an address where the corresponding write data are stored in the write area,
wherein the integration is of multiple write access entries of the management table, and
wherein the transferring of the processing history includes transferring the write data in the write area except an address range that is not included in the write address of the management table upon transfer.

8. A non-transitory computer readable medium storing a data transfer program executed by a processor provided in a first storage system for supplying a primary site, the first storage system being connected to a second storage system for supplying a secondary site, wherein the program configures the processor to execute steps comprising:
executing replication by transferring a processing history of a data volume of the first storage system to the second storage system, allowing collective transfer of multiple processing histories; and
integrating histories of multiple write accesses included in the multiple processing histories to be collectively transferred, which are duplicatedly addressed on the data volume prior to transfer of the processing history,
wherein the processing history is stored in a journal volume of the first storage system and includes a data block which stores a management table and stores, separately and in a separate area from the management table, a write data area storing write data,
wherein the management table stores a plurality of write access entries and each entry includes a sequence number indicating an order of a write access from a host, a timestamp in which the write access is received, and a write address indicating an address where the corresponding write data are stored in the write area,
wherein the integration is of multiple write access entries of the management table, and
wherein the transferring of the processing history includes transferring the write data in the write area except an address range that is not included in the write address of the management table upon transfer.

* * * * *